United States Patent
Lueghamer et al.

(10) Patent No.: US 11,987,010 B2
(45) Date of Patent: May 21, 2024

(54) METHOD FOR PRODUCING A WELDED CONNECTION, AND WELDING DEVICE

(71) Applicant: agru Kunststofftechnik Gesellschaft m.b.H., Bad Hall (AT)

(72) Inventors: Albert Lueghamer, Sierning (AT); Gerald Severa, Bad Hall (AT)

(73) Assignee: agru Kunststofftechnik Gesellschaft m.b.H., Bad Hall (AT)

( * ) Notice: Subject to any disclaimer, the term of this patent is extended or adjusted under 35 U.S.C. 154(b) by 0 days.

(21) Appl. No.: 17/275,066

(22) PCT Filed: May 22, 2019

(86) PCT No.: PCT/AT2019/060169
§ 371 (c)(1),
(2) Date: Apr. 8, 2021

(87) PCT Pub. No.: WO2020/232479
PCT Pub. Date: Nov. 26, 2020

(65) Prior Publication Data
US 2022/0055318 A1 Feb. 24, 2022

(51) Int. Cl.
*B29C 65/00* (2006.01)
*B29C 65/22* (2006.01)
(Continued)

(52) U.S. Cl.
CPC .......... *B29C 66/872* (2013.01); *B29C 65/222* (2013.01); *B29C 65/30* (2013.01);
(Continued)

(58) Field of Classification Search
CPC ............ B29C 66/872; B29C 66/73921; B29C 66/91315; B29C 66/91317
See application file for complete search history.

(56) References Cited

U.S. PATENT DOCUMENTS

| | | |
|---|---|---|
| 4,642,155 A | 2/1987 | Ramsey |
| 4,703,150 A | 10/1987 | Kunnecke et al. |
| 9,383,052 B2 | 7/2016 | Lidstroem |

FOREIGN PATENT DOCUMENTS

| | | |
|---|---|---|
| CH | 553 368 A | 8/1974 |
| CH | 601 719 A5 | 7/1978 |

(Continued)

OTHER PUBLICATIONS

Translated abstract for JP2000035178A (Year: 2000).*
International Search Report in PCT/AT2019/060169, dated Jan. 17, 2020.

*Primary Examiner* — Daniel McNally
(74) *Attorney, Agent, or Firm* — Collard & Roe, P.C.

(57) ABSTRACT

A method for connecting a thermoplastic line element to a connecting element includes the steps of: providing the at least one thermoplastic line element; providing the connecting element having a thermoplastic body wherein a heating element is embedded in the body for generating heat in a welding region for welding the body to the at least one line element; joining the connecting element to the at least one thermoplastic line element; providing a welding device for welding the connecting element to the at least one thermoplastic line element; welding the connecting element to at least one thermoplastic line element by generating heat in the welding region using the welding device. The welding of the connecting element to the at least one thermoplastic line element is stopped by the welding device before the end of the planned welding duration if an error criterion is met.

10 Claims, 4 Drawing Sheets

(51) Int. Cl.
*B29C 65/30* (2006.01)
*B29C 65/34* (2006.01)

(52) U.S. Cl.
CPC ........ *B29C 65/342* (2013.01); *B29C 66/5221* (2013.01); *B29C 66/73921* (2013.01); *B29C 66/91315* (2013.01); *B29C 66/91317* (2013.01)

(56) References Cited

FOREIGN PATENT DOCUMENTS

| | | | |
|---|---|---|---|
| CH | 632 078 A5 | 9/1982 | |
| DE | 28 48 382 A1 | 3/1980 | |
| DE | 102 25 370 A1 | 12/2003 | |
| EP | 0 173 174 A1 | 3/1986 | |
| EP | 1 369 636 A1 | 12/2003 | |
| EP | 1 745 917 A1 | 1/2007 | |
| JP | H02-196630 A | 8/1990 | |
| JP | H04-334438 A | 11/1992 | |
| JP | H06-190925 A | 7/1994 | |
| JP | H085135 B2 * | 1/1996 | |
| JP | H09-317978 A | 12/1997 | |
| JP | 200035178 A | 2/2000 | |
| JP | 2000035178 A * | 2/2000 | ......... B29C 66/1224 |
| JP | 2009-068717 A | 4/2009 | |
| KR | 10-1990-0007349 B1 | 10/1990 | |
| KR | 10-2014-0032988 A | 3/2014 | |

* cited by examiner

METHOD FOR PRODUCING A WELDED CONNECTION, AND WELDING DEVICE

CROSS REFERENCE TO RELATED APPLICATIONS

This application is the National Stage of PCT/AT2019/060169 filed on May 22, 2019, the disclosure of which is incorporated by reference. The international application under PCT article 21(2) was not published in English.

BACKGROUND OF THE INVENTION

1. Field of the Invention

The invention relates to a method for making a welded connection of a line element to a connecting element.

2. Description of the Related Art

The connecting of line elements made of a thermoplastic with the aid of a likewise thermoplastic connecting element provided with a heating element is generally known. In this context, line elements are understood to mean pipeline parts, fittings and molded parts that are joined together by the connecting elements to form lines and line networks. The connecting elements are often designed as electrofusion sockets and as electrically weldable connection and tapping clamps. However, the connecting elements can also be used for connecting elements other than pipeline elements, e.g. for joining rod portions, but the use of weldable connecting elements in pipeline construction represents one of the most common application areas. To ensure that the joining of piping elements by means of such connecting elements is reliable, it is desirable to control the welding. EP0173174A1 assumes that the quality of the weld is essentially dependent on the correct temperature in the welding region and the welding pressure generated during the welding process, i.e. the pressure exerted on the material plasticized by the heat supplied in the welding region. This is caused by the fact that the connecting element is given a shrinkage reserve, which results in shrinkage of the connecting element when the welding region is plasticized by the applied heat. This shrinkage, combined with the increase in volume of the material when the welding region is heated, causes this increase in pressure in the welding region.

Since all circumstances that prevent the correct welding temperature and welding pressure from being reached represent a reduction in the quality of the welded connection, connecting elements have for some time been equipped with additional indicating means that are intended to provide information about the quality of the weld.

In a known indicating device, a color change dot is used which is placed on the outer socket surface and changes color when the body of the connecting element is sufficiently heated. In order to achieve an improved temperature indication, it is known from CH 553 368 to place the color change dot at a location of lower wall thickness. But even in this case, only the temperature may be determined, not the welding pressure, and there is also the uncertainty that a color change can occur due to external heat influence.

Since the temperature display on the connecting element alone does not allow reliable conclusions to be drawn about the quality of the weld, solutions have also become known in which the pressure arising in the welding region of the weld is made visible. In this case, weak points which bulge out as a result of the welding pressure generated may be provided in the body of the connecting element. Furthermore, it is known from CH 632 078 to provide recesses whose bottom ends near the welding region. These fill with more or less plastic material during welding and thus indicate whether there is sufficient welding pressure with corresponding temperature in the welding region. An improvement to this weld quality indicator known from CH 601 719 is that a pin is arranged in the bore. This rises above the outer socket surface when the welding pressure occurs and is thus clearly visible. This embodiment has proved particularly useful for relatively thin-walled connecting elements. The protruding pin provides a relatively accurate measure of the temperature and welding pressure in the welding region. At higher welding pressures, however, as is common with thicker-walled connecting elements, this embodiment has the disadvantage that the depth of the bore is difficult to define. If the bottom of the bore is too close to the welding region, the movement of the pin occurs too early, but if the bottom of the bore is located away from the welding region, no movement of the pin occurs even though the welding pressure has been created.

EP1745917A1 and DE10225370A1 also each disclose electrofusion sockets for pipeline connections made of thermoplastics, wherein the electrofusion socket may be connected to a pipeline by means of an electrofusion process. To make the connection, a heating wire winding embedded in the electrofusion socket is connected to an external electrical power source, as a result of which the electrofusion socket is melted in certain regions.

The electrofusion sockets known from the prior art have the disadvantage that if the pipes are insufficiently inserted into the electrofusion socket, no sufficient connection may be made between the pipe and the electrofusion socket. This leads to leaky pipe connections. In addition, a pipe insufficiently inserted into the electrofusion socket can cause the electrofusion socket to overheat locally, which in the worst case can even lead to a fire. In the electrofusion sockets known from the prior art, an indicator for checking the correct positioning of the individual elements relative to each other is only inadequately solved.

SUMMARY OF THE INVENTION

The object of the present invention was to overcome the disadvantages of the prior art and to disclose an improved method for welding connecting elements.

This object is solved by a device and a method according to the claims.

According to the invention, a method is provided for connecting a thermoplastic line element to a connecting element. The method comprises the steps of:
  providing the at least one thermoplastic line element;
  providing the connecting element having a thermoplastic body, wherein a heating element is embedded in the body for generating heat in a welding region for welding the body to the at least one line element;
  joining the connecting element to the at least one thermoplastic line element;
  providing a welding device for welding the connecting element to the at least one thermoplastic line element;
  inputting information about the connecting element to be welded into the welding device;
  welding the connecting element to the at least one thermoplastic line element by generating heat in the welding region by means of said welding device.

The welding device stops the welding of the connecting element to the at least one thermoplastic line element before the end of the planned welding duration if an error criterion is reached. Alternatively or additionally, an error message is output by the welding device when an error criterion is reached.

The method according to the invention has the advantage that by stopping the welding process before the end of the planned welding duration when an error criterion is reached, local overheating of the connecting element and thus a critical situation, such as fire of a connecting element, may be prevented. Thus, surprisingly, the measures according to the invention can increase safety when connecting line elements to the connecting element.

Furthermore, it may be useful that the error criterion is reached if a certain number of error messages are summed up in an error counter implemented in the welding device. This has the advantage that the error criterion is not reached by a single error message, which could occur, for example, due to a measurement error, but that the error criterion is only reached if it is certain that there is actually an error due to the increased number of error messages.

Furthermore, it may be provided that an error message is added to the error counter if an actual value of the welding current lies outside a target value tolerance of a target value of the welding current over an error period. This results in the surprising advantage that the error criterion may be easily detected.

Furthermore, it may be provided that an error message is added to the error counter if an actual value of the conductor resistance of the heating element lies outside a target value tolerance of a target value of the conductor resistance of the heating element over an error period. In particular, the conductor resistance may be detected easily and reliably by means of the welding device. Surprisingly, the detection of the conductor resistance may be used to draw conclusions as to whether a correct weld has been made and thus whether the line element has been correctly joined to the connecting element.

Another advantage is an embodiment according to which it may be provided that the time frame of the error period is determined in dependence of the recorded information about the connecting element to be welded. This has the particular advantage that the switch-off criterion may be individually adapted to the connecting element to be welded. Relevant information about the connecting element to be welded can include, for example, a diameter or an embodiment of the connecting element. In addition, relevant information about the connecting element can include, for example, information about the length and diameter of the resistance heating wire.

According to a further development, it is possible that the time frame of the error period is set between 1 sec and 40 sec, in particular between 5 sec and 30 sec, preferably between 8 sec and 12 sec. Especially within these limits it has been shown that a surprisingly reliable switch-off criterion may be achieved.

Furthermore, it may be useful if the target value tolerance of the target value of the welding current and/or the target value tolerance of the target value of the conductor resistance of the heating element is determined in dependence of the recorded information about the connecting element to be welded. This has the particular advantage that the switch-off criterion may be individually adapted to the connecting element to be welded. Relevant information about the connecting element to be welded can include, for example, a diameter or a design of the connecting element. In addition, relevant information about the connecting element can include, for example, information about length, diameter, as well as the specific resistance of the resistance heating wire.

Furthermore, it may be provided that the target value tolerance of the target value of the welding current and/or the target value tolerance of the target value of the conductor resistance of the heating element is between 0.1% and 10%, in particular between 1% and 5%, preferably between 1.5% and 3% of the amount of the respective target value. Particularly with a tolerance limit in this value range, it has surprisingly been shown that a reliable switch-off criterion may be achieved.

Furthermore, it may be provided that the error criterion is reached if more than two error messages, in particular more than three error messages, preferably more than five error messages are added in the error counter. Particularly within this tolerance range, it has surprisingly been shown that a reliable switch-off criterion may be achieved.

According to a special embodiment, it is possible that the target value tolerance of the target value of the conductor resistance of the heating element is defined exclusively at the bottom of the target value of the conductor resistance. This has the surprising advantage that any measurement errors or other errors which falsely detect an increased conductor resistance do not lead to a triggering criterion.

It may further be provided that the error criterion is reached when four error messages are summed up in an error counter implemented in the welding device, wherein one error message is added to the error counter if, over an error period, an actual value of the conductor resistance of the heating element lies outside a target value tolerance of a target value of the conductor resistance of the heating element, wherein the time frame of the error period is set between 8 sec and 12 sec and wherein the target value tolerance of the target value of the conductor resistance of the heating element is between 1.5% and 3% of the amount of the respective target value. Such a combination of the individual criteria has the surprising advantage that incorrect joining of the line element and the connecting element may be reliably detected and yet no misinterpretations or undesired premature switch-offs occur. This surprising technical effect only occurs within these narrow limits or in the combination of features.

According to an advantageous further development, it may be provided that the actual value of the welding current and/or the actual value of the conductor resistance of the heating element is/are interrogated in an interrogation interval between 0.01 sec and 10 sec, in particular between 0.1 sec and 5 sec, preferably between 0.9 sec and 1.2 sec. Especially an interrogation of the actual value in this time interval brings a sufficiently representative result about the correct progress of the welding.

According to the invention, a welding device is provided for welding a thermoplastic line element to a connecting element, the welding device having a control unit and an input interface for inputting information about the connecting element to be welded, the input interface being coupled to the control unit. The welding device is designed in such a way that the welding of the connecting element to the at least one thermoplastic line element may be stopped before the end of the planned welding duration and/or an error message may be output by the welding device if an error criterion is reached.

The welding device according to the invention has the advantage that the quality of the welds may be increased.

The input of information about the connecting element to be welded into the welding device may be done by manual input by a machine operator. Alternatively, it is also conceivable that the input of information about the connecting element to be welded into the welding device is performed by detecting an information carrier attached to the connecting element, such as an RFID chip, or a barcode by means of the welding device. In yet another alternative, it is also conceivable that the input of information about the connecting element to be welded into the welding device takes place by detecting the conductor resistance by means of the welding device.

In a further embodiment, it is also conceivable that the welding device is only designed for welding one type of connecting element. In this case, the information about the connecting element to be welded is entered directly into the welding device by the manufacturer and does not need to be recorded separately for each welding process.

In particular, an input interface is provided on the welding device by means of which the information about the connecting element to be welded may be entered into the welding device. The input interface may be, for example, a keyboard, an RFID reader, a barcode reader or the like.

BRIEF DESCRIPTION OF THE DRAWINGS

For a better understanding of the invention, it is explained in more detail with reference to the following figures.

These show respectively in highly simplified, schematic representation:

FIG. 2 b) a schematic representation of the time course of the internal resistance of the resistance heating wire during the welding process of a correctly performed weld;

FIG. 3 b) a schematic representation of the time course of the internal resistance of the resistance heating wire during the welding process of a defectively performed weld;

DETAILED DESCRIPTION OF THE PREFERRED EMBODIMENTS

By way of introduction, it should be noted that in the differently described embodiments, the same parts are provided with the same reference signs or the same component designations, whereby the disclosures contained in the entire description may be transferred mutatis mutandis to the same parts with the same reference signs or the same component designations. Also, the positional indications selected in the description, such as top, bottom, side, etc., are related to the directly described as well as depicted figure, and these positional indications are to be transferred mutatis mutandis to the new position in the event of a change of position.

Figure 1:
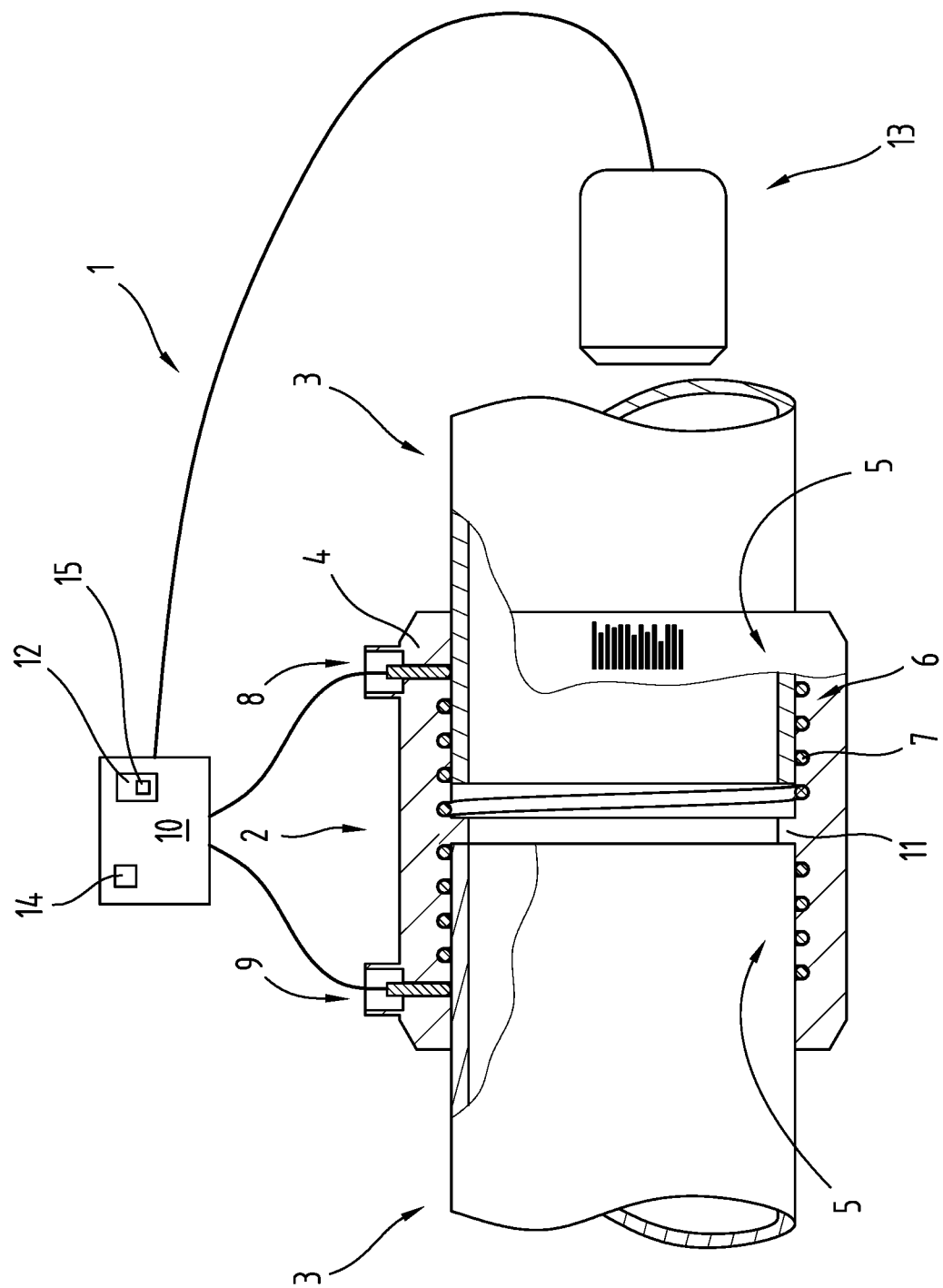
FIG. 1 a sectional view of an embodiment of a connecting element of a welding assembly.

FIG. 1 shows a first embodiment of a welding arrangement 1 with a connecting element 2 connecting line elements 3.

In the embodiment example according to FIG. 1, the connecting element 2 is in the form of an electrofusion socket, and the line elements 3 are in the form of pipes.

As can be seen from FIG. 1, provision may be made for the connecting element 2 to have a thermoplastic body 4 in which a heating element 6 is arranged in a welding region 5. The heating element 6 may in particular be in the form of a resistance heating wire 7.

For example, it is conceivable that the connecting element 2 serves to connect two line elements 3 and thus two welding regions 5 are formed in the body 4 of the connecting element 2.

One of the welding regions 5 is used here for welding the connecting element 2 to the first line element 3, and a second of the welding regions 5 is used here for welding the connecting element 2 to the second line element 3.

As further shown in FIG. 1, it may be provided that the heating element 6 has a first connection point 8 and a second connection point 9, each of which serves for connection to a welding device 10. The two connection points 8, 9 may be formed in the region of the two longitudinal ends of the connecting element 2 as shown in FIG. 1, whereby both welding regions 5 may be heated simultaneously by means of the welding device 10. In particular, the welding regions 5 may be heated by applying an electric current and an electric voltage to the first connection point 8 and the second connection point 9 of the heating element 6 by means of the welding device 10. As a result of this and the conductor resistance of the heating element 6, the heating element 6 heats up.

Furthermore, it is also conceivable that a first connection point 8 and a second connection point 9 for the welding device 10 are formed for each welding region 5. This enables each of the two welding regions 5 to be heated individually and independently of one another, and a welded connection to be made separately between the connecting element 2 and the first line element 3 and between the connecting element 2 and the second line element 3.

As can be seen from FIG. 1, an abutment 11 may be provided on the body 4 of the connecting element 2 serves to correctly position the two line elements 3 in the connecting element 2. The abutment 11 may be formed centrally in the connecting element 2.

As may be further seen from FIG. 1, the welding device 10 has a control unit 12 used to control the welding process or to control the welding device 10.

Furthermore, the welding device 10 has an input interface 13 which is coupled to the control unit 12. The input interface 13 is used to record information about the connecting element 2 to be welded and/or about the line elements 3 welded. In the embodiment example according to FIG. 1, the input interface 13 is designed as a scanner, which is used to record a barcode printed on the connecting element 2.

Additionally, the welding device 10 may include a display unit 14 used to output information to a machine operator. The display unit 14 may be coupled to a control panel that is used to operate the welding machine 10 by a user.

Furthermore, an error counter 15 may be implemented in the control unit 12 which is used to record errors during the welding process. The error counter 15 may be implemented in the programming of the control unit 12

In the following, FIG. 1 is used to describe the welding process for joining the thermoplastic line element 3 to the connecting element 2.

To weld the connecting element 2 to the line elements 3, the line elements 3 are inserted into the connecting element 2. Furthermore, information on the nature of the connecting element 2 is entered into the welding device 10.

Furthermore, the first connection point Band 8 and the second connection point 9 the connecting element 2 are connected to the welding device 10, so that welding of the connecting element 2 to the line element 3 is possible.

During the welding process itself, current is applied to the first connection point 8 and the second connection point 9 so that the resistance heating wire 7 causing the connecting element 2 to be melted in the welding region 5. When the line elements 3 are correctly inserted into the connecting element 2, the connecting element 2 can fuse with the line element 3 thereby achieving a sufficiently tight connection of the line elements 3 to the connecting element 2.

If, as shown in FIG. 1 on the right-hand line element 3, the line element 3 is not correctly inserted into the connecting element 2, this can result in that section of the welding region 5 of the connecting element 2 against which the line element 3 does not abut melting in an uncontrolled manner due to the lack of heat dissipation. This can lead to uncontrolled leakage of the material of the connecting element 2 in this region.

Due to this discharge of material of the connecting element 2, it may furthermore occur that two windings of the resistance heating wire 7 contact each other due to the resulting displacements, whereby the winding loop of these two adjacent windings of the resistance heating wire 7 is short-circuited and thus bridged. By means of the method according to the invention, this effect can surprisingly be used to be able to detect by means of the welding device 10 whether the welding is being carried out correctly and, if necessary, to stop the welding process and/or to output an error message from the welding device.

Figure 2A:
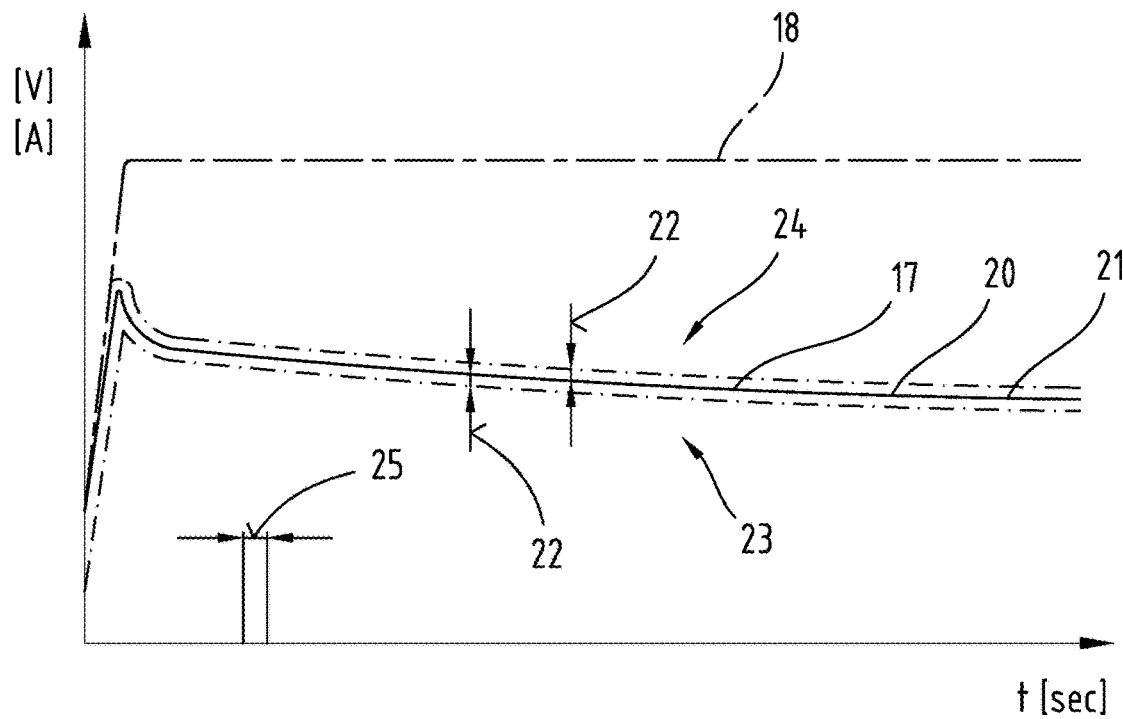
FIG. 2 a) a schematic representation of the time course of the current and voltage during the welding process of a correctly performed weld.

FIG. 2a shows the time course of the welding current 17 and the welding voltage 18. The elapsed time in seconds is shown on the abscissa. The amount of the welding current 17 is shown in amperes on the ordinate. The amount of the welding voltage 18 is shown in volts on the ordinate.

As can be seen from FIG. 2a, it may be provided that the welding voltage 18 is raised to a certain value when the welding device 10 is activated for welding, and is subsequently kept constant at this value. The welding current 17 may decrease as seen over the time course of the welding process, since a conductor resistance 19 heating wire 7 increases due to the heating of the resistance heating wire 7.

The course of the welding current 17 as shown in FIG. 2a is the course that occurs with a correctly welded connecting element 2 and was determined as the actual value 21 of the welding current 17 with a correctly welded connecting element 2. The time course of the welding current 17 shown in FIG. 2a can thus be used as the target value 20 of the welding current 17 for a comparable connecting element 2. In the present representation according to FIG. 2a, the actual value 21 of the welding current 17 is thus congruent with the target value 20 of the welding current 17.

However, the target value 20 of the welding current 17 is different for each different embodiment of the connecting element 2. To determine the target value 20 of the welding current 17, welding tests may be carried out with the individual different versions of the connecting element 2. Alternatively, it is also conceivable that the course of the target value 20 of the welding current 17 is determined by calculation.

A target value tolerance 22 may be calculated from the target value 20 of the welding current 17. The target value tolerance 22 of the welding current 17 may be arranged on a lower side 23 of the target value 20 of the welding current 17 and/or on an upper side 24 of the target value 20 of the welding current 17. Thus, deflections of the welding current 17 may be detected either only downwards or only upwards or both downwards and upwards.

The actual value 21 of the welding current 17 may be interrogated at an interrogation interval 25, with a measurement of the actual value 21 of the welding current 17 being made at intervals during the interrogation interval 25.

Figure 2B:
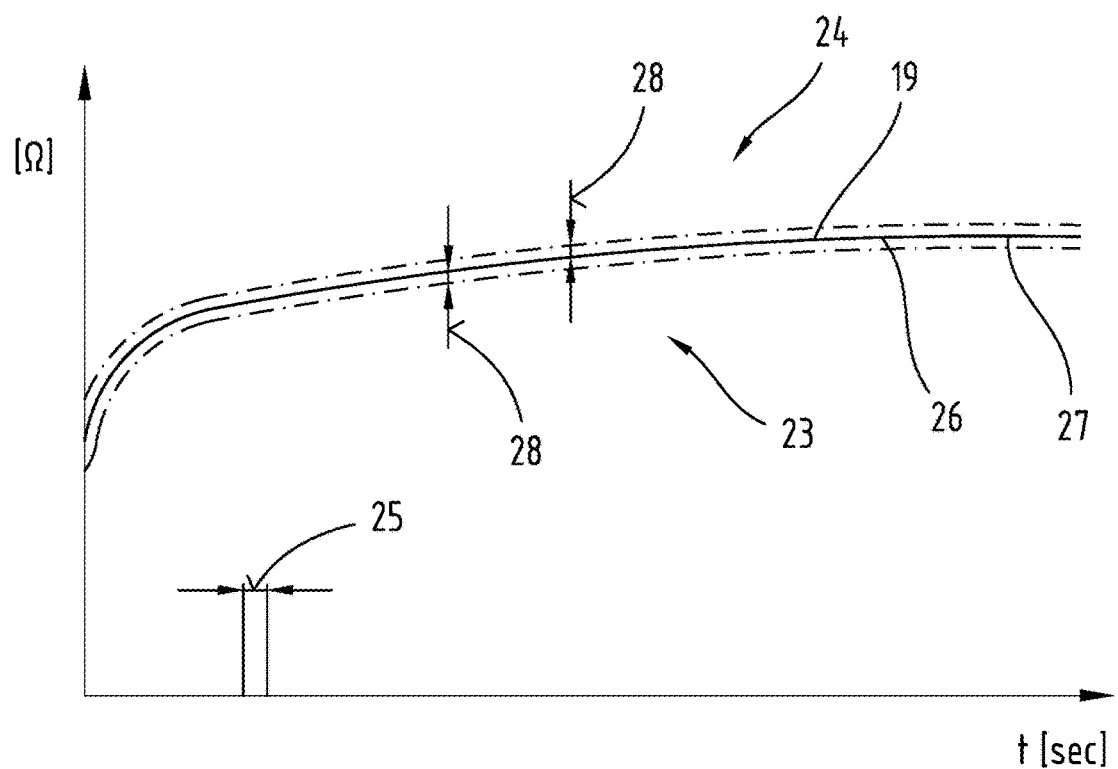

FIG. 2b shows the time course of the conductor resistance 19 over the welding process. The elapsed time in seconds is shown on the abscissa. The magnitude of the conductor resistance 19 is shown in ohms on the ordinate. As can be seen from FIG. 2b, the conductor resistance 19 increases over the course of time.

The course of the conductor resistance 19 as shown in FIG. 2b is the course that occurs with a correctly welded connecting element 2 and was determined as the actual value 27 of the conductor resistance 19 with a correctly welded connecting element 2. The time course of the conductor resistance 19 shown in FIG. 2b can thus be used as the target value 26 of the conductor resistance 19 for a comparable connecting element 2. In the present representation according to FIG. 2b, the actual value 27 of the conductor resistance 19 is thus congruent with the target value 26 of the conductor resistance 19.

As can be seen from FIG. 2b, the actual value 27 of the conductor resistance 19 increases over time as the resistance heating wire 7 is progressively heated.

However, the target value 26 of the conductor resistance 19 is different for each different embodiment of the connecting element 2. To determine the target value 26 of the conductor resistance 19, welding tests may be carried out with the individual different versions of the connecting element 2. Alternatively, it is also conceivable that the course of the target value 26 of the conductor resistance 19 is determined by calculation.

A target value tolerance 28 of the conductor resistance 19 may be calculated from the target value 26 of the conductor resistance 19, which may be used to check the correct welding. The target value tolerance 28 of the conductor resistance 19 may be arranged at a lower side 23 of the target value 26 of the conductor resistance 19 and/or at an upper side 24 of the target value 26 of the conductor resistance 19. Thus, deflections of the conductor resistance 19 may be detected either downward only, or upward only, or both downward and upward.

The actual value 27 of the conductor resistance 19 may be interrogated at an interrogation interval 25, with a measurement of the actual value 27 of the conductor resistance 19 being made at intervals during the interrogation interval 25.

Figure 3A:
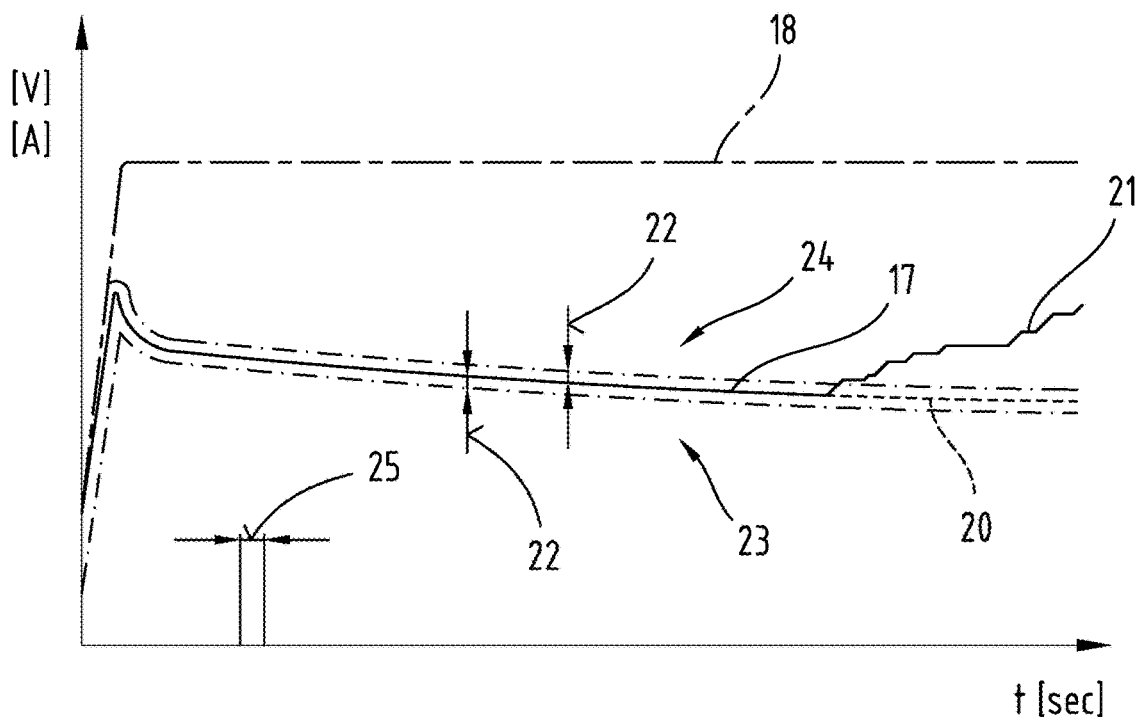
FIG. 3 a) a schematic representation of the time course of the current and voltage during the welding process of a defectively performed weld.

FIG. 3a shows the time course of the welding current 17 in the case of an incorrectly connected connecting element 2, again using the same reference signs or element designations for the same elements as in the preceding FIG. 2a. To avoid unnecessary repetition, reference is made to the detailed description in the preceding FIG. 2a.

As can be seen from FIG. 3a, if the connecting element 2 is not connected correctly, the actual value 21 of the welding current 17 may increase if two or more turns of the resistance heating wire 7 come into contact with each other and are thus short-circuited. In this case, the actual value 21 of the welding current 17 may lie outside the target value tolerance 22 of the welding current 17 whereby an error criterion may be determined.

FIG. 3a shows the time course of the welding current 17 in the case of an incorrectly connected connecting element 2, again using the same reference signs or element designations for the same elements as in the preceding FIG. 2a.

To avoid unnecessary repetition, reference is made to the detailed description in the preceding FIG. 2a.

Figure 3B:
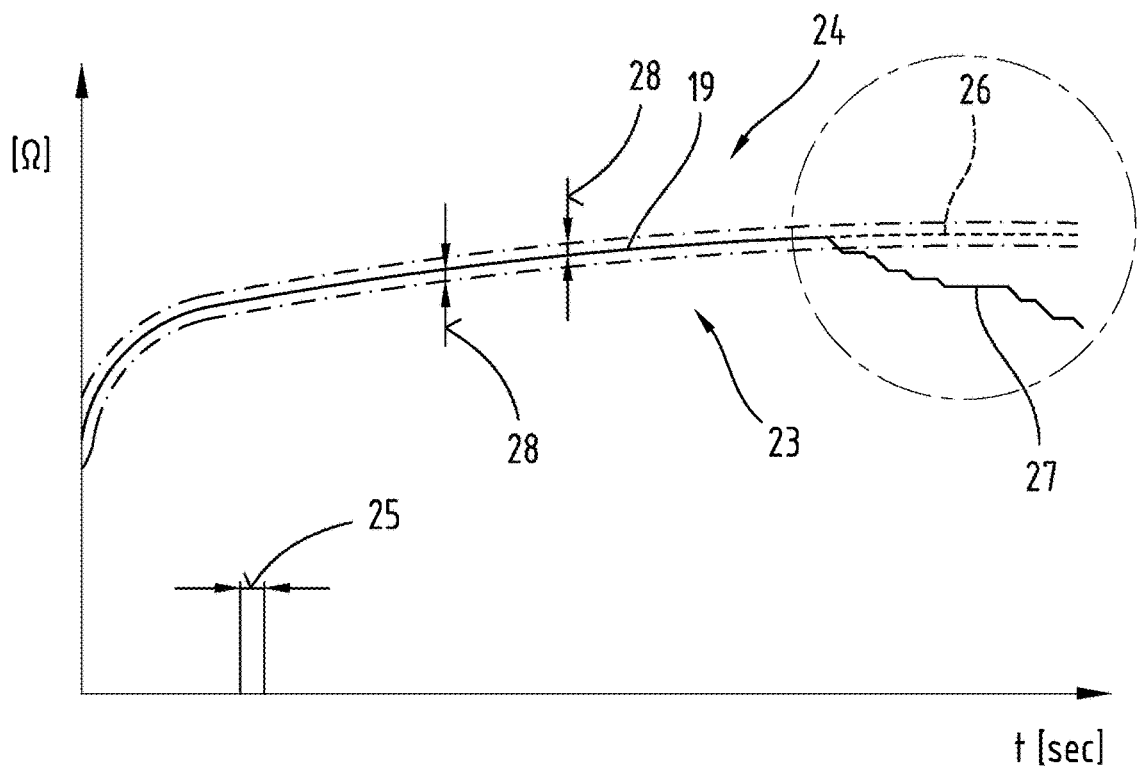

FIG. 3b shows the corresponding course of the actual value 27 of the conductor resistance 19 of an incorrectly welded connecting element 2, again using the same reference signs or element designations for the same elements as in the preceding FIG. 2b. In order to avoid unnecessary repetitions, reference is made to the detailed description in the preceding FIG. 2b.

As can be seen from FIG. 3b, over the time course of the welding process, the actual value 27 of the conductor resistance 19 has fallen below the target value tolerance 28 arranged at the lower side 23 of the target value 26 of the conductor resistance 19, This may be used as an error criterion to stop the welding process prematurely and/or to output an error message.

Figure 4:
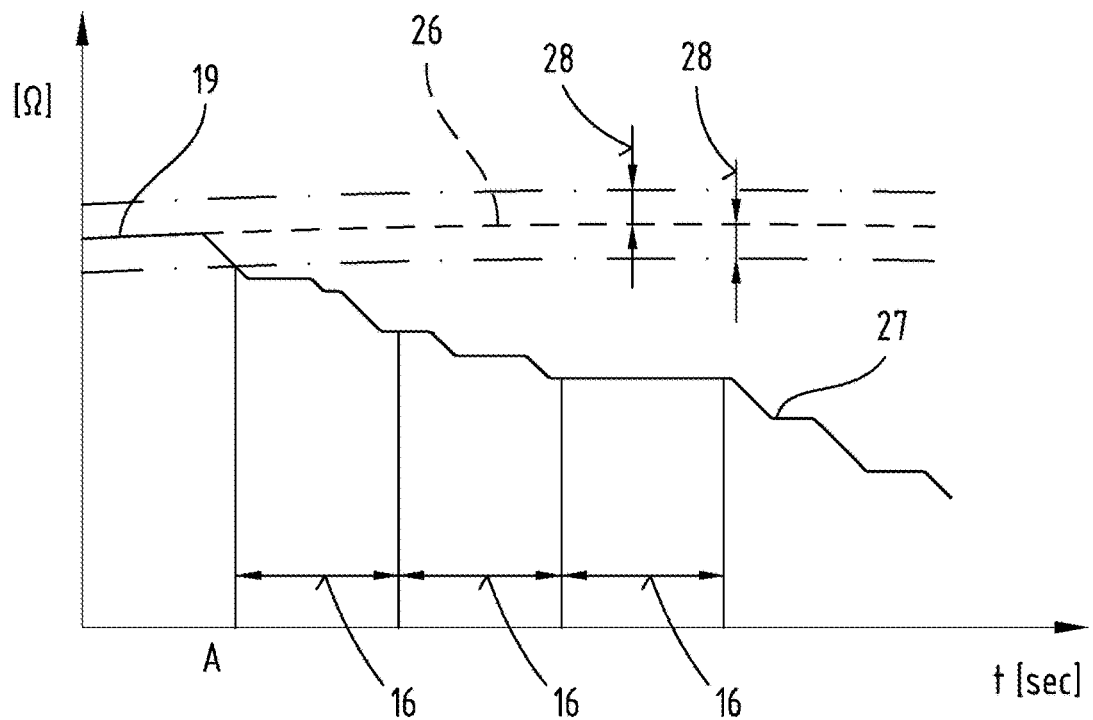
FIG. 4 a detailed view of a first embodiment for achieving a switch-off criterion.

FIG. 4 shows a detailed view of detail X from FIG. 3b, again using the same reference signs or element designations for the same elements as in the preceding FIG. 3b. To avoid unnecessary repetition, reference is made to the detailed description in the preceding FIG. 3b.

With reference to FIG. 4, an embodiment example is described of how an error criterion for stopping the welding process before the end of the planned welding duration may be defined.

As soon as the actual value 27 of the conductor resistance 19 falls below the target value tolerance 28 of the conductor resistance 19 and this is detected by the welding device 10, this event may be referred to as a start event A. From this start event A, an error period 16 begins to run.

If the actual value 27 of the conductor resistance 19 lies outside the target value tolerance 28 of the conductor resistance 19 over the complete error period 16, an error message is transmitted to the error counter 15. At the end of the first error period 16, a second error period 16 begins to run, whereby an error message is also transmitted to the error counter 15 if the actual value 27 of the conductor resistance 19 falls below the target value tolerance conductor resistance 19 over the entire error period 16

In particular, it may be specified that the error criterion is reached when a certain number of error messages are counted in the error counter 15. In the present example according to FIG. 4, for example, there are three error messages.

Figure 5:
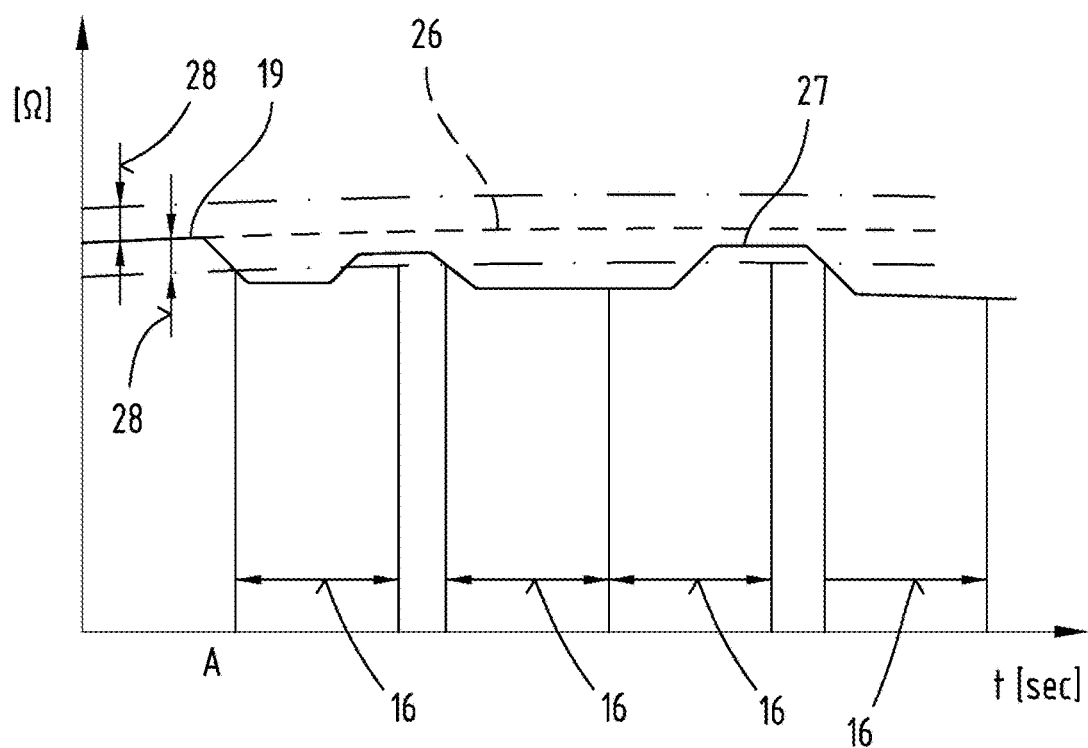
FIG. 5 a detailed view of a second embodiment for achieving a switch-off criterion.

FIG. 5 shows a further process sequence that can occur during a welding operation, again using the same reference signs or element designations for the same elements as in the preceding FIG. 3b. To avoid unnecessary repetition, reference is made to the detailed description in the preceding FIG. 3b.

As can be seen from FIG. 5, if the actual value falls below the target value tolerance 28 the error period 16 may begin to run. However, if the actual value 27 of the conductor resistance 19 returns within the target value tolerance 28 the conductor resistance 19 is output to the error counter 15. If the target value tolerance 28 of the conductor resistance 19 falls below the actual value 27 of the conductor resistance 19 again, the error period 16 starts running anew. Since in the present embodiment example there is an undershooting of the target value tolerance 28 over the complete error period 16, an error message is transmitted to the error counter 15 at the end of the error period 16. Immediately following this second error period 16 a third error period 16 begins to run. However, since the target value tolerance 28 of the conductor resistance 19 is not undershot for the entire third error period 16, no error message is output to the error counter 15 here either. If the target value tolerance 28 falls below again, the error period 16 starts to run again. Since in the present embodiment example the actual value 27 of the conductor resistance 19 falls below the target value tolerance 28 of the conductor resistance 19 over the complete error period 16, a further error message is generated in the error counter 15 in this case. In the present embodiment example according to FIG. 5, two error messages have thus been transmitted to the error counter 15 in the visible detail. It may be specified as an error criterion that the welding process is stopped if two error messages are counted in the error counter 15, which in the present embodiment example would result in the error criterion being reached at the end of the fourth error period 16.

Each time a welding process is restarted, provision may be made for the error counter 15 to be reset to zero.

The operations described in FIGS. 4 and 5 may, of course, be applied mutatis mutandis to the detection of the actual value 21 of the welding current 17, The embodiment examples show possible embodiment variants, whereby it should be noted at this point that the invention is not limited to the specifically depicted embodiment variants thereof, but rather also various combinations of the individual embodiment variants with each other are possible and this variation possibility is due to the teaching for technical action by the present invention in the skill of the person skilled in this technical field.

The scope of protection is determined by the claims. However, the description and the drawings are to be consulted for the interpretation of the claims. Individual features or combinations of features from the different embodiments shown and described may constitute independent inventive solutions in their own right. The object underlying the independent inventive solutions may be taken from the description.

All indications of value ranges in the present description are to be understood as including any and all subranges thereof, e.g. the indication 1 to 10 is to be understood as including all subranges starting from the lower limit 1 and the upper limit 10, i.e. all subranges start with a lower limit of 1 or greater and end with an upper limit of 10 or less, e.g. 1 to 1.7, or 3.2 to 8.1, or 5.5 to 10.

Finally, for the sake of order, it should be noted that, for a better understanding of the layout, elements have been shown partially out of scale and/or enlarged and/or reduced in size.

LIST OF REFERENCE NUMBERS

1 Welding assembly
2 Connecting element
3 Line element
4 Body
5 Welding region
6 Heating element
7 Resistance heating wire
8 First connection point
9 Second connection point
10 Welding machine
11 Abutment
12 Control unit
13 Input interface
14 Display unit
15 Error counter
16 Error period
17 Welding current
18 Welding voltage
19 Conductor resistance 20 Welding current target value
21 Welding current actual value
22 Target value tolerance welding current
23 Lower side target value
24 Upper side target value
25 Interrogation interval
26 Target value conductor resistance
27 Actual value conductor resistance
28 Target value tolerance conductor resistance

The invention claimed is:

1. A method for connecting a thermoplastic line element to a connecting element comprising the method steps:
providing the at least one thermoplastic line element;
providing the connecting element having a thermoplastic body, wherein a heating element is embedded in the body for generating heat in a welding region for welding the body to the at least one line element;
joining the connecting element to the at least one thermoplastic line element;
providing a welding device for welding the connecting element to the at least one thermoplastic line element;
inputting information about the connecting element to be welded into the welding device;
welding the connecting element to the at least one thermoplastic line element by generating heat in the welding region by means of the welding device;
stopping via the welding device the welding of the connecting element to the at least one thermoplastic line element before an end of a planned welding duration and/or outputting via the welding device an error message when an error criterion is reached;
wherein an error counter, which is implemented in the welding device, sums up a number of error events;
wherein the welding device is has a control unit configured such that:
the error criterion is reached when a specified number of error events are summed up;
an error message is added to the error counter when, over an error period, an actual value of a welding current lies outside a target value tolerance of a target value of the welding current;
if the actual value of the welding current returns within the target value tolerance of the welding current within the error period, no error message is output to the error counter and if the actual value of the welding current lies outside the target value tolerance of the target value of the welding current again, the error period starts running anew; and
if there is an overshooting of the target value tolerance over the complete error period, an error message is transmitted to the error counter at the end of the error period.

2. The method according to claim 1, wherein a time frame of the error period is determined in dependence of detected information about the connecting element to be welded.

3. The method according to claim 1, wherein a time frame of the error period is set between 1 sec and 40 sec.

4. The method according to claim 1, wherein the target value tolerance of the target value of the welding current and/or the target value tolerance of the target value of a conductor resistance of the heating element is between 0.1% and 10% of the amount of the respective target value.

5. The method according to claim 1, wherein the error criterion is reached when more than two error messages are added in the error counter.

6. The method according to claim 1, wherein the target value tolerance of the target value of a conductor resistance of the heating element is defined exclusively at the lower side of the target value of the conductor resistance.

7. The method according to claim 1, wherein the error criterion is reached when four error messages are summed up in an error counter implemented in the welding device, wherein one error message is added to the error counter, when, over an error period, an actual value of a conductor resistance of the heating element lies outside a target value tolerance of a target value of the conductor resistance of the heating element, wherein a time frame of the error period is set between 8 sec and 12 sec and wherein the target value tolerance of the target value of the conductor resistance of the heating element is between 1.5% and 3% of the amount of the respective target value.

8. A welding device for welding a thermoplastic line element to a connecting element, the welding device having a control unit and an input interface for inputting information about the connecting element to be welded, the input interface being coupled to the control unit;
wherein the welding device is designed to stop the welding of the connecting element to the at least one thermoplastic line element before an end of a planned welding duration and/or to output an error message by the welding device when an error criterion is reached;
wherein an error counter, which is implemented in the welding device, is configured to sum up a number of error events;
wherein the control unit is configured such that the error criterion is reached when a specified number of error events are summed up;
wherein the control unit is configured such that an error message is added to the error counter when, over an error period, an actual value of a welding current lies outside a target value tolerance of a target value of the welding current;
wherein the control unit is configured such that if the actual value of the welding current returns within the target value tolerance of the welding current within the error period, no error message is output to the error counter and if the actual value of the welding current lies outside the target value tolerance of the target value of the welding current again, the error period starts running anew; and
wherein the control unit is configured such that if there is an overshooting of the target value tolerance over the complete error period, an error message is transmitted to the error counter at the end of the error period.

9. A method for connecting a thermoplastic line element to a connecting element comprising the method steps:
providing the at least one thermoplastic line element;
providing the connecting element having a thermoplastic body, wherein a heating element is embedded in the body for generating heat in a welding region for welding the body to the at least one line element;
joining the connecting element to the at least one thermoplastic line element;
providing a welding device for welding the connecting element to the at least one thermoplastic line element;
inputting information about the connecting element to be welded into the welding device;
welding the connecting element to the at least one thermoplastic line element by generating heat in the welding region by means of the welding device;
stopping via the welding device the welding of the connecting element to the at least one thermoplastic line element before an end of a planned welding duration and/or outputting via the welding device an error message when an error criterion is reached, wherein an error counter, which is implemented in the welding device, sums up a number of error events;

wherein the welding device is has a control unit configured such that:

the error criterion is reached when a specified number of error events are summed up;

an error message is added to the error counter when, over an error period, an actual value of a conductor resistance of the heating element lies outside a target value tolerance of a target value of the conductor resistance of the heating element;

if the actual value of the conductor resistance returns within the target value tolerance of the conductor resistance within the error period, no error message is output to the error counter and if the actual value of the conductor resistance of the heating element lies outside the target value tolerance of the target value of the conductor resistance of the heating element again, the error period starts running anew; and if there is an undershooting of the target value tolerance over the complete error period, an error message is transmitted to the error counter at the end of the error period.

10. A welding device for welding a thermoplastic line element to a connecting element, the welding device having a control unit and an input interface for inputting information about the connecting element to be welded, the input interface being coupled to the control unit;

wherein the welding device is designed to stop the welding of the connecting element to the at least one thermoplastic line element before an end of a planned welding duration and/or to output an error message by the welding device when an error criterion is reached;

wherein an error counter, which is implemented in the welding device, is configured to sum up a number of error events;

wherein the control unit is configured such that the error criterion is reached when a specified number of error events are summed up;

wherein the control unit is configured such that an error message is added to the error counter when, over an error period, an actual value of a conductor resistance of the heating element lies outside a target value tolerance of a target value of the conductor resistance of the heating element;

wherein the control unit is configured such that if the actual value of the conductor resistance returns within the target value tolerance of the conductor resistance within the error period, no error message is output to the error counter and if the actual value of the conductor resistance of the heating element lies outside the target value tolerance of the target value of the conductor resistance of the heating element again, the error period starts running anew; and wherein the control unit is configured such that if there is an undershooting of the target value tolerance over the complete error period, an error message is transmitted to the error counter at the end of the error period.

\* \* \* \* \*

UNITED STATES PATENT AND TRADEMARK OFFICE
CERTIFICATE OF CORRECTION

PATENT NO. : 11,987,010 B2
APPLICATION NO. : 17/275066
DATED : May 21, 2024
INVENTOR(S) : Albert Lueghamer et al.

It is certified that error appears in the above-identified patent and that said Letters Patent is hereby corrected as shown below:

In the Claims

In Column 11, Line 34 (Line 24 of Claim 1), after "device" delete "is"

In Column 13, Line 5 (Line 24 of Claim 9), after "device" delete "is"

Signed and Sealed this
Nineteenth Day of November, 2024

Katherine Kelly Vidal
*Director of the United States Patent and Trademark Office*